United States Patent
Kanta et al.

(10) Patent No.: US 11,714,743 B2
(45) Date of Patent: Aug. 1, 2023

(54) AUTOMATED CLASSIFICATION OF DEFECTIVE CODE FROM BUG TRACKING TOOL DATA

(71) Applicant: Red Hat, Inc., Raleigh, NC (US)

(72) Inventors: Srinivasa Bharath Kanta, Bangalore (IN); Veera Raghava Beri Reddy, Bangalore (IN); Pawan Vinayak Dhiran, Bangalore (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/328,640

(22) Filed: May 24, 2021

(65) Prior Publication Data

US 2022/0374333 A1    Nov. 24, 2022

(51) Int. Cl.
*G06F 11/36* (2006.01)
*G06N 20/00* (2019.01)

(52) U.S. Cl.
CPC ...... *G06F 11/3664* (2013.01); *G06F 11/3644* (2013.01); *G06F 11/3692* (2013.01); *G06N 20/00* (2019.01)

(58) Field of Classification Search
CPC ............. G06F 11/3664; G06F 11/3644; G06F 11/3692; G06N 20/00
See application file for complete search history.

(56) References Cited

U.S. PATENT DOCUMENTS

| 10,248,919 B2 | 4/2019 | Shuster et al. |
| 10,853,231 B2 | 12/2020 | Guenther et al. |
| 2018/0276562 A1 * | 9/2018 | Woulfe ............... G06N 3/0445 |
| 2020/0097387 A1 * | 3/2020 | Loyola ................ G06F 11/366 |

(Continued)

FOREIGN PATENT DOCUMENTS

| CN | 101727533 B | 6/2014 |
| CN | 109615242 A | 4/2019 |
| WO | 2020210947 A1 | 10/2020 |

OTHER PUBLICATIONS

Goseva-Popstojanova, Katerina, and Jacob Tyo. "Identification of security related bug reports via text mining using supervised and unsupervised classification." 2018 IEEE International conference on software quality, reliability and security (QRS). IEEE, 2018. (Year: 2018).*

(Continued)

*Primary Examiner* — S. Sough
*Assistant Examiner* — Joanne G Macasiano
(74) *Attorney, Agent, or Firm* — K&L Gates LLP

(57) ABSTRACT

Systems and methods are described for automated classification of defective code from bug tracking tool data. An example method includes receiving a plurality of datasets representing a plurality of bug reports from a bug tracking application. Each dataset may be generated by vectorizing and clustering a source code associated with a respective bug report represented by the dataset. Each dataset may comprise a plurality of classes. At least one class of each dataset may indicate at least one known bug. For each dataset of the plurality of datasets, a respective supervised feature vector may be generated. Each supervised feature vector may be associated with an index of the at least one class with the at least one known bug. Using the supervised feature vectors, a classification model is trained to detect a new bug presence in a new source code.

19 Claims, 5 Drawing Sheets

(56) References Cited

U.S. PATENT DOCUMENTS

2020/0133756 A1* 4/2020 Sun ........................ G06F 11/079
2022/0229705 A1* 7/2022 Mody ..................... G06F 9/5077
2022/0335331 A1* 10/2022 Lin ......................... G06F 18/27

OTHER PUBLICATIONS

Lee, et al.; "Improving bug report triage performance using artificial intelligence based document generation model"; Lee and Seo Hum. Cent. Comput. Inf. Sci. (2020); (22 pages).
Jonsson, et al.; "Automated bug assignment: Ensemble-based machine learning in large scale industrial contexts"; Empir Software Eng.; Springer Science+Business Media New York 2015; (46 pages).
Bhattacharya, et al.; "Automated, highly-accurate, bug assignment using machine learning and tossing graphs"; The Journal of Systems and Software 85 (2012) 2275-2292; Nov. 30, 2010; (18 pages).

* cited by examiner

AUTOMATED CLASSIFICATION OF DEFECTIVE CODE FROM BUG TRACKING TOOL DATA

BACKGROUND

The testing phase is an important aspect of a software development life cycle. The testing phase may include unit testing, integration testing, system testing, regression testing, acceptance testing, alpha testing, beta testing, performance testing, load testing, stress testing, usability testing, security testing, and portability testing. Developers often rely on bug tracking tools, such as BUGZILLA, during the testing phase to test different aspects of a software before transitioning to subsequent phases of the software development life cycle (e.g., the production and maintenance phases). Such tools are used on an existing source code to track a bug, an error, flaw, mistake, or fault in a computer program or system that can produce an incorrect or an unexpected result.

SUMMARY

The present disclosure provides new and innovative systems and methods for automated classification of defective code from bug tracking tool data. In an example, a method includes receiving a plurality of datasets representing a plurality of bug reports from a bug tracking application. Each dataset may be generated by vectorising and clustering a source code associated with a respective bug report represented by the dataset. Each dataset may include a plurality of classes. At least one class of each dataset may indicate at least one known bug (e.g., the portion of the source code represented by the class may have the known bug). For each dataset of the plurality of datasets, a respective supervised feature vector may be generated. Each supervised feature vector may be associated with an index of at least one class with the at least one known bug. The method may further include training, using the supervised feature vectors, a classification model that can detect, using a given dataset, an index of a given class having a given bug. The trained classification model may then be used to detect a new bug presence in a new source code. In some aspects, a new source code may include an old or existing source code that is augmented with new source code.

The plurality of datasets used in the training of the classification model may be formed by performing one or more iterations of: receiving a source code; vectorizing the source code into a dataset of a plurality of unsupervised feature vectors; and performing an unsupervised clustering of the dataset into a plurality of classes. The source code may be received from a repository associated with a bug tracking application (e.g., BUGZILLA). The plurality of classes may be auto-indexed. Each class of the plurality of classes may be a subset of the dataset. Each class may include one or more unsupervised feature vectors of the plurality of unsupervised feature vectors. Furthermore, at least one class of the plurality of classes may include the at least one known bug. In some aspects, a predetermined set of filters may be applied to clean the source code to result in fewer unsupervised feature vectors after vectorization.

In an example, a system includes a clustering module; a classification module; memory; and one or more processors in communication with the memory. The memory may store instructions that, when executed by the one or more processors, may cause the processors to perform one or more methods described herein. In another example, a non-transitory computer-readable medium is disclosed for use on a computer system containing computer-executable programming instructions for automated classification of defective code from bug tracking tool data. The computer-executable programming instructions cause the performance of one or more methods described herein.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
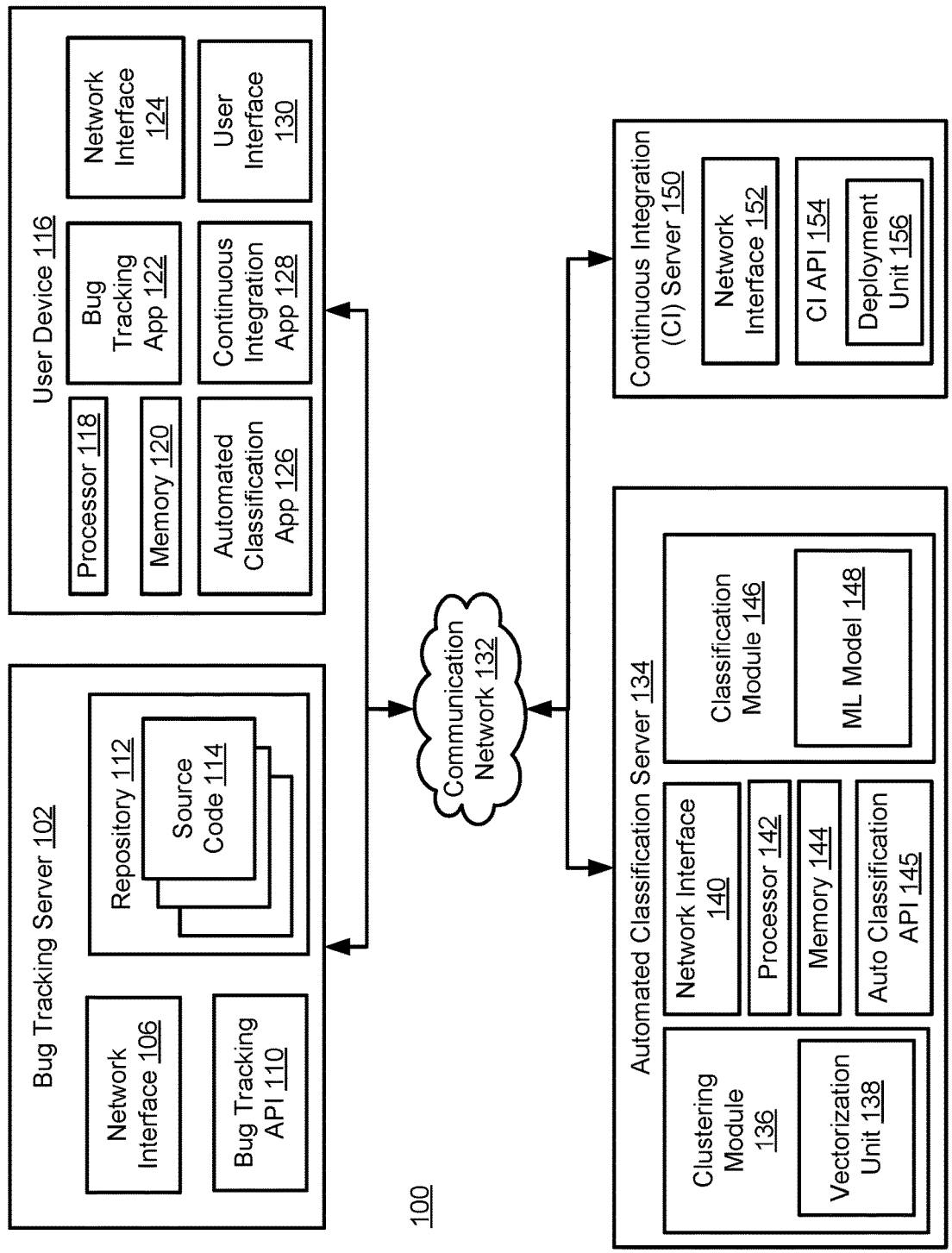
FIG. 1 illustrates a block diagram of an example computer network environment for automated classification of defective code from bug tracking tool data, according to an example embodiment of the present disclosure.

A software bug is an error, flaw, mistake, or fault in a computer program or system that can produce an incorrect or an unexpected result. Developers often rely on bug tracking tools, such as BUGZILLA, to track bugs during the testing phase of the software development lifecycle before transitioning to subsequent phases of the software development life cycle. However, bugs are often missed from detection in the testing phase due to various reasons. For example, existing bug tracking tools may not test all parts of a computer program or system for bugs. The testing by the bug tracking tools may be restricted due to hardware limitations. Furthermore, such tools are not designed to be dynamic and cannot be continuously integrated within the software development lifecycle, e.g., in real-time. Even further, the documents used for testing may be improper to begin with or may rely on outdated conceptions of bugs (e.g., and thus unable to detect the latest instances of bug, or predict new forms of software defects). A piece of a computer program or system deemed to be bug-free at the testing phase, when it is actually not bug-free, can be problematic at subsequent phases of the software development lifecycle, as this piece of the computer program or system may be subsequently multiplied, appended to, or otherwise relied on in the final product. Thus, the bug count may actually increase from phase to phase or time to time in the software development lifecycle. There is a need for an automated tracking of defective code that is continuously integrated into the software development lifecycle.

Various embodiments of the present disclosure describe novel and nonobvious systems and methods for automated classification of defective code from bug tracking tool data. Such systems and methods may overcome one or more of the shortcomings described above. An example method automatically tracks defective code in real-time by periodically receiving various bug reports from a bug tracking tool, clustering source code files associated with the bug reports, and developing a robust classification model that can allow a user to efficiently and reliably detect bug presence in any portion or aspect of a given source code file at any stage of a software development lifecycle. Each bug report may comprise a source code file that can be clustered into various classes (e.g., aspects or portions of the source code file). At least one class of the source code file may indicate the presence of a bug. Using the clustered source code files and the knowledge of which class of each source code file has the bug, a classification model can be trained. The trained classification model can be used to predict, from a given source code file, a class of the given source code file that indicates a bug presence. The ability to access the trained machine learning model at any point in the software development lifecycle can prevent bugs from aggregating throughout each phase of the software development lifecycle. Also, the accessibility and efficiency of the classification model may allow the user to seamlessly integrate a source code file into at any application or platform of a software development operation. Furthermore, contrary to conventional bug tracking tools that may often rely on obsolete bug data, the trained classification model relies on supervised and unsupervised learning from bug reports that are periodically received from bug tracking tools. This causes the trained machine learning model to be dynamic and more attuned to evolutions and developments of new bugs.

FIG. 1 illustrates a block diagram of an example computer network environment for automated classification of defective code from bug tracking tool data, according to an example embodiment of the present disclosure. The network environment 100 may include a bug tracking server 102, a user device 116, an automated classification server 134, and a continuous integration (CI) server 150. One or more of these components may be able to communicate with one another over a communication network 132. As will be described, these components may be used to retrieve various source code (e.g., aspects of test suites, programs, scripts, files, etc.) from the bug tracking server, perform an automated clustering of components of the source code, perform an automated classification, train a classification model to identify classes with a bug presence, and use the classification model identify classes with the bug presence, according to an example embodiment of the present disclosure.

Figure 2:
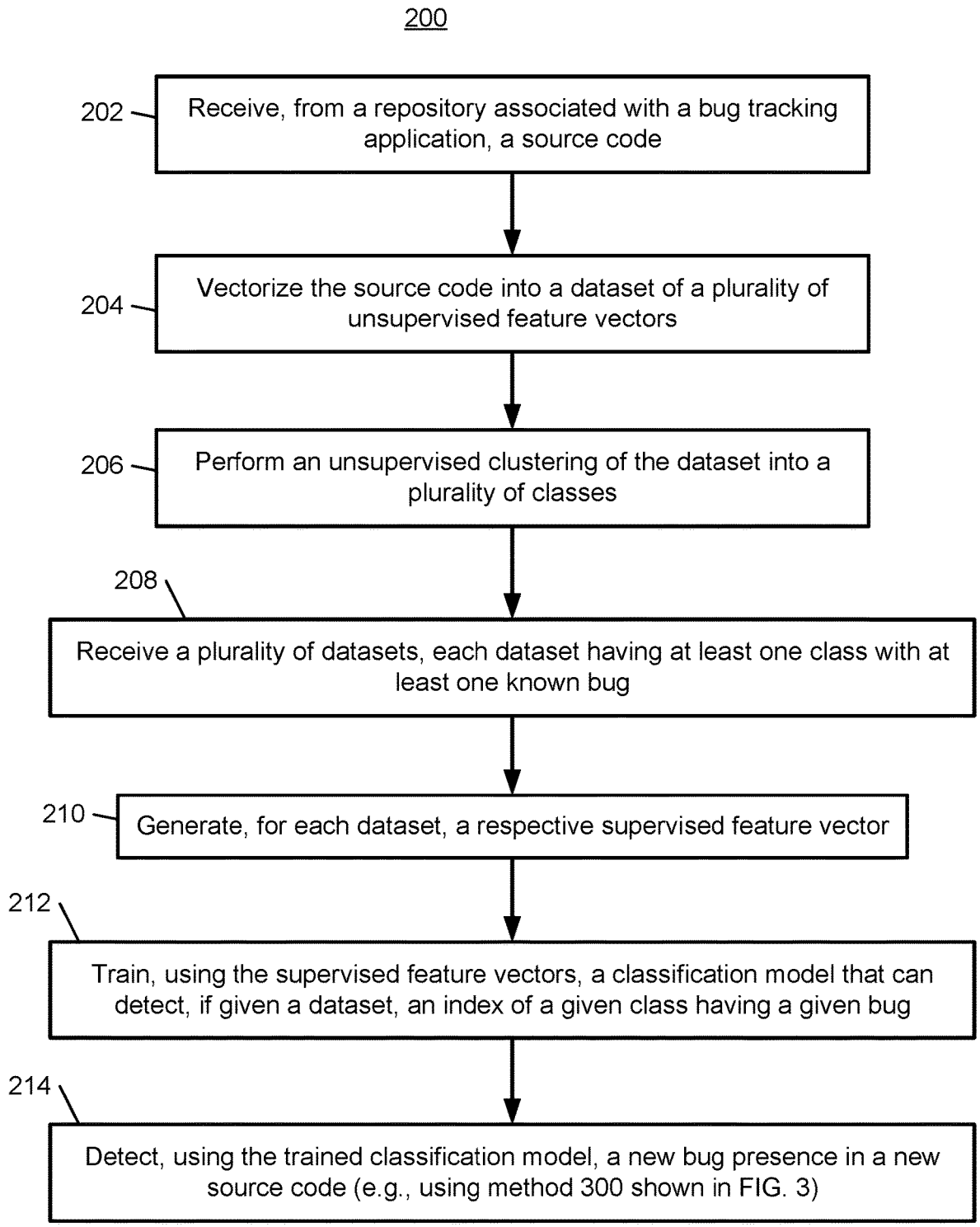
FIG. 2 illustrates a flowchart of an example process for automated classification of defective code from bug tracking tool data according to an example embodiment of the present disclosure.
Figure 3:
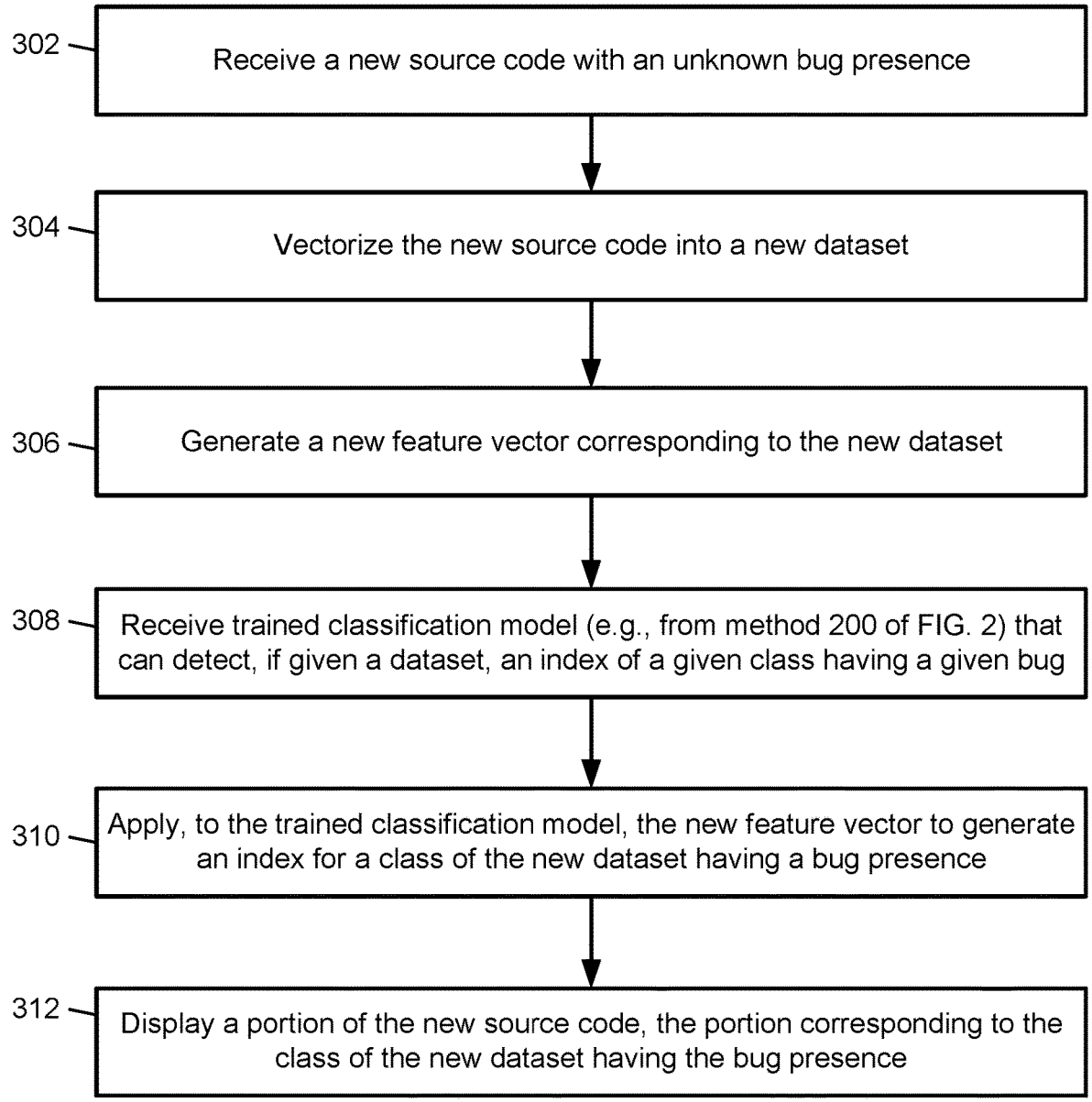
FIG. 3 illustrates a flowchart of an example process for detecting a new bug presence in a new source code, according to an example embodiment of the present disclosure.

For example, at a high level, a user involved in developing a software in the software development lifecycle may wish to test a piece of the software, e.g., outside of the 'testing phase' of the software development lifecycle. The user, via their user device 130, may feed the piece of the software (e.g., a new source code) into a trained classification model. For example, the user may receive the piece of software from the bug tracking server 102 (e.g., via bug tracking app 122), have doubts over whether the bug tracking tool associated with the bug tracking server 102 correctly determined that there were no bugs in the piece of software, and then upload the piece of software into the automated classification server 134 for further testing, e.g., via automated classification app 126. The automated classification server 134 may apply a classification model to the piece of software to identify any classes with a bug presence. The classification model may be trained (e.g., by separately obtaining various source code files from the bug tracking server 102, undergoing unsupervised learning to cluster the various source code files, and undergoing supervised learning to classify those clusters based on known bug presence). FIG. 2 describes an example of such training in further detail. The trained classification model can thus be applied to the piece of software that the user sends to the automated classification server 134 to detect any bug presence in the piece of software. FIG. 3 describes an application of the trained classification model in further detail. After the user corrects a portion of a source code corresponding to classes with the bug presence, the user may upload and/or deploy the corrected piece of software into the software development operation pipeline at the continuous integration (CI) server 150 via the continuous integration (CI) app 128.

The bug tracking server 102, the automated classification server 134, and the CI server 150 may comprise a local or a remote computing system for performing operations associated with bug tracking, automated classification, and deployment of software in the development operation (DevOps) pipeline, respectively. Furthermore, the bug tracking server 102, the automated classification server 134, and the CI server 150 may host, manage, or otherwise facilitate the bug tracking app 122, automated classification app 126, and the CI app, respectively, via application program interfaces (the bug tracking API 110, the automated classification API 145, or the CI API 154, respectively).

The bug tracking server 102 may comprise a local or a remote computing system for performing operations associated with bug tracking tools, such as BUGZILLA, ANDROID Bug Reports, etc. The bug tracking server 102 may host, manage, or otherwise facilitate the bug tracking app 122, that may run on various devices (e.g., user device 116), via an application program interface (e.g., the bug tracking API 110). The bug tracking server 102 may be relied on by software developers to perform a preliminary testing of software for bugs and other defects. Furthermore, the bug tracking server 102 perform testing on a plurality of different portions of software, programs, test suites, and/or scripts, which may be saved as source code 114 within a repository 112. The bug tracking server 102 may also include a network interface 106 that allow the bug tracking server 102 to communicate with other devices over the communication network 132.

The user device 116 may comprise a standalone or portable computing device (e.g., a mobile device, personal digital assistant, laptop, tablet computers, smart camera, etc.) having one or more of the subcomponents described herein for allowing a user (e.g., a software developer) to automatically perform testing of software using a trained classification model. The user device 116 may include, for example, a processor 118, memory 120, the bug tracking app 122, a network interface 124, the automated classification app 126, the continuous integration app 128, and a user interface 130. The processor 118 may comprise any one or more types of digital circuit configured to perform operations on a data stream, including functions described in the present disclosure. The memory 120 may comprise any type of long term, short term, volatile, nonvolatile, or other memory and is not to be limited to any particular type of memory or number of memories, or type of media upon which memory is stored. The memory may store instructions that, when executed by the processor 114, can cause the user device 116 to perform one or more methods discussed herein. As discussed, the user device 116 may be associated with a user that wishes to perform a more in depth and robust testing of bugs in a software, via a system that is continuously integrated to the software development operation in real-time, and is based on a classification model that is continuously learning to better identify bug presence from source code. The bug tracking application 122 can thus allow the user to retrieve bug reports or source code of a piece of software (e.g., a program or a test suite) that has been tested by an existing bug tracking tool (e.g., BUGZILLA) for further analysis. The automated classification application 126 can allow the user to provide the retrieved source code for an in-depth analysis for bugs using the systems and methods discussed herein. The user interface 130 may allow the user to view the results of any bug tracking operation or analysis, work on the original source code to correct or remove the source of the bug, interact with the one or more applications on the user device (e.g., bug tracking app 122, automated classification app 126, and CI app 128), and deploy the final source code back to the software development operations pipeline. The CI app 128 thus allows the user to interact with cloud capabilities and tools (e.g., CI server 150) to deploy source code into the software development operations pipeline.

The automated classification server 134 may comprise a local or a remote computing system for performing steps, methods, or operations associated with automated classification of defective code from bug tracking tool data. The automated classification server 134 may host, manage, or otherwise facilitate the automated classification app 126, via an application program interface (e.g., auto classification API 145). The automated classification server 134 may be relied on by software developers to perform a more in depth analysis of various aspects of a software to overcome shortcomings of bug tracking tools previously discussed. For example, the automated classification server 134 may provide a more in depth and robust testing of bugs in a software that is continuously integrated to the software development operation in real-time, and is based on a classification model that is continuously learning to better identify bug presence from source code. Furthermore, the automated classification server 134 can perform testing on a plurality of different portions of software, programs, test suites, and/or scripts, which may be retrieved, e.g., from bug tracking tools by the user device 116. The automated classification server 134 may also include a network interface 140 to communicate with other devices over the communication network 132.

The automated classification server 134 may include one or more processors (e.g., processor 142) and memory 144. The processor 142 may comprise any one or more types of digital circuit configured to perform operations on a data stream, including functions described in the present disclosure. The memory 144 may comprise any type of long term, short term, volatile, nonvolatile, or other memory and is not to be limited to any particular type of memory or number of memories, or type of media upon which memory is stored. The memory may store instructions that, when executed by the processor 142, can cause the automated classification server 134 to perform one or more methods discussed herein. For example, the automated classification server 134 may train a classification model that can detect, using a given source code, a portion of the source code having a given bug.

The automated classification server 134 may include a clustering module 136 and a classification module 146, each of which may comprise a program, application, plug-in, or code. The clustering module 136 may receive, for the training of the classification model, a plurality of source codes with known bug presence in a portion of each source code. As used herein, a source code may refer to a code sequence, script, program, or software that can be divided into portions, and can be vectorized into quantifiable features. If the source code is vectorized, each portion of the source code may correspond to a cluster or a class of the source code. The clustering module 136 may thus include a sub-module (e.g., program, instructions, script, etc.) for vectoring the source code, e.g., via a vectorizing unit 138. The clustering module 136 may assist in assigning different vectorized units of the source code (e.g. unsupervised feature vectors) to clusters or classes of the source code. It is to be appreciated that for the training of the classification model, one or more clusters or classes of the source code may have a known bug presence.

The classification module 146 may receive (e.g., from the clustering module) training datasets to train a classification model that can detect, using a given source code, a portion of the source code having a given bug. For example, each training dataset may comprise a plurality of classes of a vectorized source code, with at least one class having at least one known bug presence. Each training dataset may have, as its domain, a feature vector based on the plurality of classes of the vectorized source code. The range of the training dataset may comprise an index of a class that has a known bug presence. The index of the class may identify the portion of the source code with the bug presence. The classification module 146 may thus perform a supervised machine learning based on the association of the feature vectors with the indices of the classes, in order to generate a machine learning (ML) model 148 (e.g., a classification model). In some aspects, the ML model 148 may be periodically or continually trained based on new source code that is made accessible at the classification module 146. Furthermore, the user device 116 may use the ML model 148 to perform rigorous testing of new source code for bug presence. Upon detection and identification of bugs within a source code, a user may revise the source code and then deploy the source code for further software development operations (e.g., via CI server 150).

The CI server 150 may comprise a local or a remote computing system for performing steps, methods, or operations associated with continuously integrating source code, including programs and other aspects of software into a software development operations pipeline. The CI server 150 may host, manage, or otherwise facilitate the CI app 128, via an application program interface (e.g., CI API 154). For example, a deployment unit 156 associated with the CI API 154 may facilitate the deployment of source code (e.g. a source code that has been drafted or corrected by a user via user device 116) into one or more applications associated with the software development operations lifecycle. The CI server 150 may also include a network interface 140 to communicate with other devices over the communication network 132.

The communication network 132 comprises wired and wireless networks. Examples of the wired networks may include a wide area network (WAN) or a local area network (LAN), a client-server network, a peer-to-peer network, and so forth. Examples of the wireless networks comprise Wi-Fi, a global system for mobile communications (GSM) network, and a general packet radio service (GPRS) network, an enhanced data GSM environment (EDGE) network, 802.5 communication networks, code division multiple access (CDMA) networks, Bluetooth networks or long term evolution (LTE) network, LTE-advanced (LTE-A) network or 5th generation (5G) network.

FIG. 2 illustrates a flowchart of an example process 200 for automated classification of defective code from bug tracking tool data according to an example embodiment of the present disclosure. The process 200 may be performed by one or more processors of the automated classification server used to receive source codes with known bugs to train a classification model, or to apply trained classification model to a new source code to test for bug presence (e.g., as in processor 142 of automated classification server 134). Also or alternatively, one or more steps of process 200 may be performed by a processor of a user device associated with a user (e.g., a software developer) that seeks to perform testing of software using a classification mode presented herein. For simplicity, "computing device" may be used to refer to the device associated with the processor(s) of the automated classification server, the user device, or both, unless specified. Although the example process 200 is described with reference to the flow diagram illustrated in FIG. 2, it will be appreciated that many other methods of performing the acts associated with the process 200 may be used. For example, the order of some of the blocks may be changed, certain blocks may be combined with other blocks, blocks may be repeated, and some of the blocks described may be optional.

Process 200 may begin with the computing device receiving, from a repository associated with a bug tracking application, a source code (block 202). In some aspects, the repository nay be based on a server associated with the bug tracking application (e.g., repository 112 of the bug tracking server 102), and the source code may comprise one of many programs, software, scripts, or aspects thereof that were retained by the bug tracking server 102 for testing for bugs. For example, while the bug tracking tools (e.g., BUGZILLA) may be utilized by users to test various pieces of software, copies of such pieces of software may be retained by the bug tracking tool (e.g., at the bug tracking server 102) even though the bug tracking tools may have already provided the results of a bug search (e.g., by having identified a portion of the source code as having a bug). Also or alternatively, as will be described in relation to FIG. 3, the source code may be provided to computing device (e.g., the automated classification server 134) by the user device 116. For example, a user that is skeptical about the bug tracking results provided by a bug tracking tool for a source code may send the source code to the automated classification server 134 via the automated classification app 126.

The computing device may vectorize the source code into a dataset of a plurality of unsupervised feature vectors (block 204). For example, the vectorization unit 138 of the automated classification server 134 may vectorize the source code. The vectorization may involve parsing the source code into tokens or units, and labeling each token or unit with a feature vector. For example, the feature vector may comprise numeric values for a plurality of variable (e.g., $x_1$, $x_2$, etc.) representing different aspects of the token or unit. Vectorizing the source code thus allows different tokens or units the source code to be represented numerically to allow clustering via unsupervised machine learning to occur. Since the clustering may not be based on the supervised learning from a "correct," form of clusters, the feature vectors used in the clustering is thus referred to as "unsupervised" feature vectors for simplicity to distinguish from other feature vectors used in other machine learning application discussed herein. The unsupervised feature vectors resulting from the vectorization of the source code (e.g., from step 204) may be referred to as a dataset.

The computing device may perform an unsupervised clustering of the dataset into a plurality of classes (block 206). For example, the clustering module 136 of the automated classification server 134 may perform one or more operations to arrange the dataset of the plurality of unsupervised feature vectors into a plurality of classes. For example, the unsupervised clustering of the dataset into the plurality of classes may involve determining a degree of similarity between a given unsupervised feature vector of the plurality of unsupervised feature vectors and another unsupervised feature vector of the plurality of unsupervised feature vectors. The degree of similarity may be determined using a variety of techniques, including, but not limited to, cosine similarity, Jaccard similarity, Euclidean Distance, Manhattan Distance, or Minkowski distance. Furthermore, performing unsupervised clustering to the dataset may involve applying, to the plurality of unsupervised feature vectors, one or more of: a density-based spatial clustering of applications with noise (DBSCAN), a K-means clustering operation, an expectation-maximization, or a hierarchical clustering operation. The result of the unsupervised clustering operation may comprise a dataset arranged into different classes or clusters of feature vectors based on similarity of the feature vectors. These classes or clusters of the dataset may be representative of the source code broken up into different classes or clusters.

In some aspects, the source code may be filtered before it is vectorized. For example, the source code may include aspects (e.g., comment statements, null values, etc.) that are not relevant for the detection of bug presence or that otherwise have no functionality. A predetermined set of filters may be applied to the source code to clean the source code (e.g., remove such aspects that are not relevant or functional). The set of filters may be predetermined based on the types of syntax and lexical tokens that are recognized as being not relevant or not functional, and may vary based on the programming language or the development platform being used. Applying to filters to clean the source code may thus result in fewer unsupervised feature vectors after vectorization (e.g., as in block 202). However, having fewer but more relevant feature vectors may lead to faster run time of the clustering operations, leading to more datasets being produced (e.g., for supervised learning in subsequent blocks). The larger number and greater relevance of datasets may lead to more robust machine learning models in subsequent steps, leading to increased accuracy and reliability.

It is to be appreciated that blocks 202-206 may be performed in many iterations (e.g., throughout the software development process) to generate a plurality of datasets that can be used in subsequent steps. For example, the automated classification server 134 may continuously or periodically retrieve, from the bug tracking server 102, sample source codes with known bug presences, vectorize each source code into a plurality of unsupervised feature vectors, and perform unsupervised clustering of the unsupervised feature vectors into a plurality of classes, e.g., representing different portions or aspects of the source code. Each class of the plurality of classes may have multiple unsupervised feature vectors assigned to it via the clustering process. At least one class of the plurality of classes will represent a portion or aspect of the source code having the known bug presence. The computing device may automatically index each of the plurality of classes (e.g., via autoindexing), with at least one index referring to at least one class with at least one known bug. For example, a source code for which corresponding unsupervised feature vectors are clustered into seven classes may be autoindexed as, C1, C2, C3, ... C7, and one of the classes (e.g., C3) may correspond to a portion of the source code having a known bug presence. As such, numerous datasets can be produced that can be used in the training of supervised machine learning models in subsequent steps. The clustering process and generation of datasets, as explained in relation to blocks 202-206, may occur in shorter intervals as compared to the subsequent training of supervised machine learning models, as it is to be appreciated that the supervised training may rely on a larger number of datasets produced from blocks 202-206.

The computing device may receive a plurality of datasets, each dataset having at least one class with at least one known bug (block 208). For example, classification module 146 of the automated classification server 134 may receive the plurality of datasets from the clustering module 136 of the automated classification server 134. The received datasets may be training datasets for supervised learning described herein because the datasets include a domain associated with a range. Each dataset may include, as its domain, a set of different classes or clusters of a source code, of which the computing device can learn to identify which one of the classes or clusters may have the bug presence. The dataset may include, as its range, an index of the class or cluster having the bug presence.

The computing device may generate, for each dataset, a respective supervised feature vector (block 210). Such supervised vectors are distinguishable from the unsupervised feature vectors previously discussed. For example, as previously discussed, the unsupervised feature vectors are generated by vectorising each unit or token of a source code (e.g., to numerically represent different units or tokens of a source code for clustering into classes), with each unsupervised feature vector representing the unit or token of the source code. Each supervised feature vector, however, may numerically represent the cluster or classes of the dataset itself (e.g., the different clusters or classes of the units or lexical tokens of the source code). Each supervised feature vector may numerically represent a class or cluster of a sample source code. In some aspects, the supervised feature vector may include, as each of its variables ($x_1$, $x_2$, etc.), an unsupervised features numerically representing the different units or tokens present in the cluster. The supervised feature vector may be associated with, or linked to, a value indicating the presence or absence of a bug within the cluster or class (e.g., a value of "1" to indicate presence and a value of "0" to indicate an absence).

Also or alternatively, each supervised feature vector may represent each dataset (e.g., each sample source code) itself, with the variables ($x_1$, $x_2$, etc.) of the supervised feature vector representing aspects of each of the classes or clusters of the sample source code. The supervised feature vector may be associated with, or linked to, a range vector indicating the presence of a bug in one of the classes of the dataset. For example, a sample source code represented by a dataset comprising seven classes (e.g., seven portions of the source code) auto indexed as {C1, C2, C3, ... C7} may have a range vector of {0, 0, 1, 0, 0, 0} that indicates a bug presence in class C3.

The computing device may train, using the supervised feature vectors, a classification model that can detect, if given a dataset, an index of a given class having a given bug (block 212). For example, the classification module 146 of the automated classification server 134 may learn what values or functions to use for parameters ($\Theta_1$, $\Theta_2$, etc.) corresponding to the variables of the supervised vectors. The training process may include one or more iterative operations to minimize the cost function associated with having the classification model detect the index of the given class having the given bug. For example, the training may iteratively testing hypothesized logistic regression functions using hypothesized parameters to predict the index of a class having a bug. An error or cost function may be used to determine when the hypothesized logistic regression function consistently produces results within a predetermined tolerance level of error (e.g., via gradient descent). After meeting this tolerance level, the learned parameters and/or weights of the model may be saved and stored, e.g., as ML model 148. Furthermore the classification model may be improved to reduce runtime and increase its accuracy and reliability, by cleaning the source code of irrelevant or non-functional aspects, as previously discussed.

The computing device may detect, using the trained classification model, a new bug presence in a new source code (e.g., using method 300 shown in FIG. 3) (block 214). As discussed, the classification model 146 of the automated classification server 134 may be trained using sample source codes continually or periodically retrieved from the bug tracking server 102, applying clustering operations, and running a supervised machine learning using knowledge of classes or clusters having a bug presence. However, the resulting classification model can be relied on by users (e.g., software developers) to test pieces of software at any point in the software development process. FIG. 3 explains examples of block 214 in more detail.

FIG. 3 illustrates a flowchart of an example process 300 for detecting a new bug presence in a new source code, according to an example embodiment of the present disclosure. Process 300 may be performed by one or more processors of the automated classification server used to apply the trained classification model from process 200 to a new source code to test for bug presence (e.g., as in processor 142 of automated classification server 134). Also or alternatively, one or more steps of process 300 may be performed by a processor of a user device associated with a user (e.g., a software developer) that seeks to perform testing of software using a classification mode presented herein. For simplicity, "computing device" may be used to refer to the device associated with the processor(s) of the automated classification server, the user device, or both, unless specified. Although the example process 300 is described with reference to the flow diagram illustrated in FIG. 3, it will be appreciated that many other methods of performing the acts associated with the process 300 may be used. For example, the order of some of the blocks may be changed, certain blocks may be combined with other blocks, blocks may be repeated, and some of the blocks described may be optional.

The computing device may receive a new source code with an unknown bug presence (block 302). For example, a user (e.g., a software developer) may seek to test a piece or aspect of a software being developed for bug activity (e.g., whether the source code corresponding to the piece or aspect of the software has a presence of any bug in any class or cluster of the source code). The user may wish to perform enhanced testing after receiving the testing results provided by a bug tracking tool (e.g., provided by bug tracking server 102 via bug tracking app 122). Also or alternatively, the user may wish to perform additional testing for bug activity after not being satisfied with the testing results provided by the bug tracking tool. The user may input the piece or aspect of the software that is desired to be tested for bug activity (e.g., the "new source code") into the automated classification app 126 of user device 116. The automated classification server 134 can thus receive the new source code to be tested through the automated classification API 145 via the communication network 132.

The computing device may vectorize the new source code into a new dataset (block 304). For example, the clustering module 136 of the automated classification server 134 may vectorize the new source code, e.g., via the vectorization unit 138. The techniques employed for vectorising the new source code may be similar to that discussed in relation to step 204 of method 200. For example, vectorising the new source code may involve parsing the new source code into tokens or units, and labeling each token or unit with an unsupervised feature vector. In some aspects, method 300 may further involve determining clusters or classes for the unsupervised feature vectors (e.g., using techniques that are similar to those described in relation to block 206 of method 200). The resulting classes or clusters of the new source code may be referred to as "new dataset."

The computing device may generate a new feature vector corresponding to the new dataset (block 306). For example, classification module 146 of the automated classification server 134 may generate the new feature vector. The techniques for generating a new feature vector corresponding to the new dataset may similar to that employed in block 210 of method 200. For example, each new feature vector may numerically represent the cluster or classes of the new dataset itself (e.g., the different clusters or classes of the units or lexical tokens of the new source code). Also or alternatively, the new feature vector may represent the new dataset (e.g., the source code to be tested) itself, with the variables ($x_1$, $x_2$, etc.) of the feature vector representing aspects of each of the classes or clusters of the new source code. However, unlike the datasets discussed in method 200, bug activity of the new source code is unknown (e.g., it is unknown which of the clusters or classes of the new source code has bug presence, if any).

The computing device may receive a trained classification model (e.g., from method 200 of FIG. 2) that can detect, if given a dataset, an index of a given class having a given bug (block 308). For example, the automated classification server 134 may retrieve, e.g., from classification module 145, a classification model 146 previously trained via method 200 shown in FIG. 2. In some aspects, a plurality of classification models may be stored, and a classification model that is most appropriate or relevant for the new source code and/or new dataset may be retrieved. For example, specific classification models may be particularly suited for certain aspects of software, e.g., by being trained on datasets that correspond to source code of such certain aspects of software.

The computing device may apply, to the trained classification model, the new feature vector to generate an index for a class of the new dataset having a bug presence (block 310). For example, the classification module 146 may apply the feature vector to the ML model 148 deemed as appropriate to generate an index for the class of the new dataset having the bug presence. In some aspects, the application may involve providing the trained parameters ($\Theta_1$, $\Theta_2$, etc.) of the classification model in which the defined variables of the feature vector ($x_1$, $x_2$, etc.) are to operate under in order to output the index for the class of the new dataset having the bug presence.

The computing device may display a portion of the new source code, the portion corresponding to the class of the new dataset having the bug presence (block 312). For example, the user may view the class or cluster of the new source code (the portion of the software being developed that is found to have a bug presence). The portion may be displayed via a user interface 130 associated with the automated classification app 126. The user may choose to revise (e.g., delete, replace, add, update, etc.) the portion of the new source code corresponding to the class or cluster with the bug presence, and present revised source code for integration into a software development operation platform (e.g., via continuous integration app 128).

Figure 4:
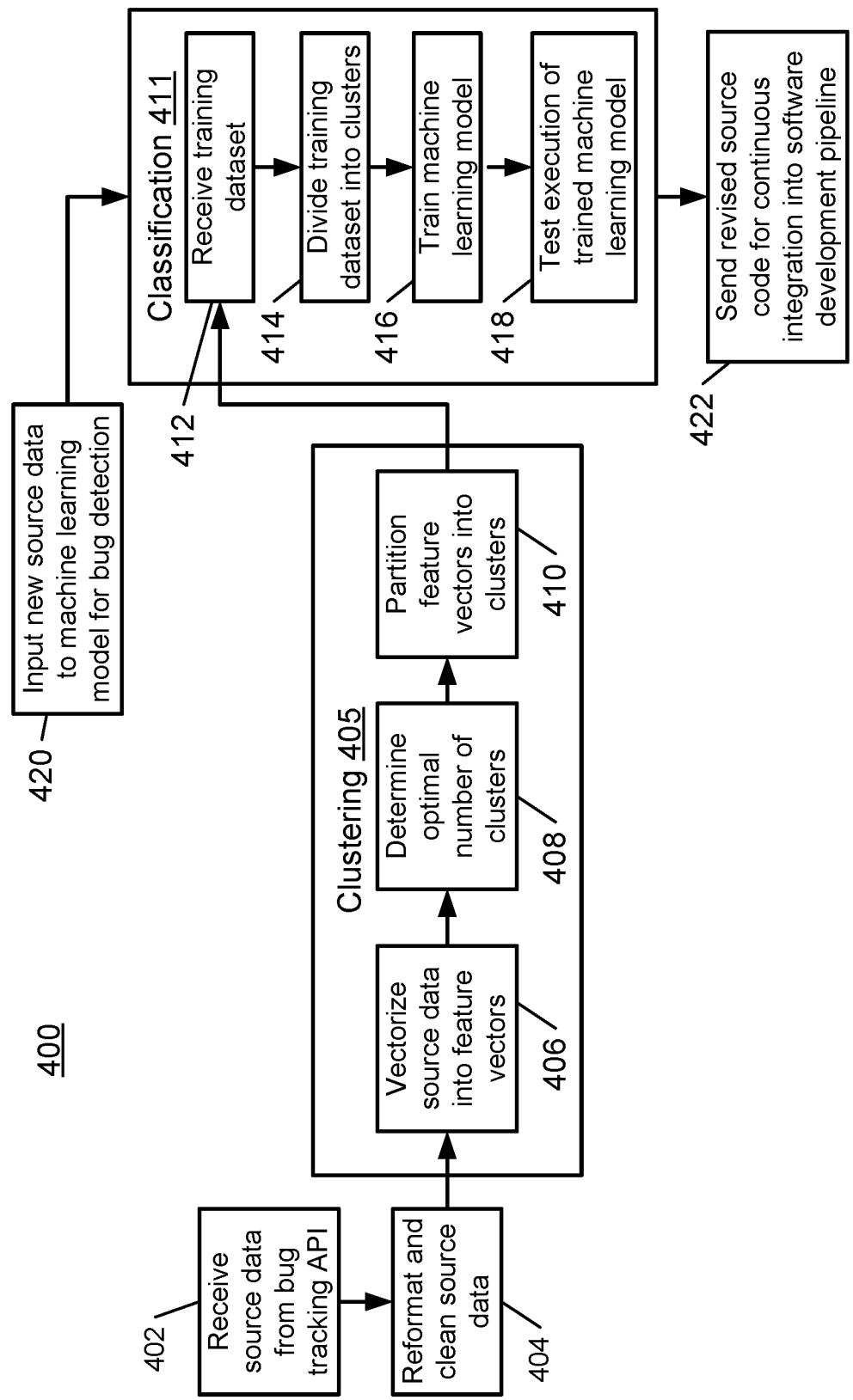
FIG. 4 illustrates a flow diagram of an example process for automated classification of defective code from bug tracking tool data, according to an example embodiment of the present disclosure.

FIG. 4 illustrates a flow diagram of an example process for automated classification of defective code from bug tracking tool data, according to an example embodiment of the present disclosure.

Process 400 may be performed by one or more processors of the automated classification server. For example, blocks 406-410, which involve clustering 405, may be performed by the clustering module 136 of the automated classification server 134. Blocks 412-418, which involve classification 411, may be performed by the classification module 146 of the automated classification server 134. Also or alternatively, one or more steps of process 400 may be performed by a processor of a user device associated with a user (e.g., a software developer) that seeks to perform testing of software using a classification mode presented herein. For simplicity, "computing device" may be used to refer to the device associated with the processor(s) of the automated classification server, the user device, or both, unless specified. Although the example process 400 is described with reference to the flow diagram illustrated in FIG. 4, it will be appreciated that many other methods of performing the acts associated with the process 400 may be used. For example, the order of some of the blocks may be changed, certain blocks may be combined with other blocks, blocks may be repeated, and some of the blocks described may be optional.

Method 400 may begin with the computing device receiving source data from a bug tracking API (block 402). For example, the automated classification server 134 may receive sample source codes (e.g., periodically or continuously) from the bug tracking API 110 of the bug tracking server 102.

The computing device may reformat and clean the source data (block 404). For example, as discussed previously, a predetermined set of filters may be applied to the source code to clean the source code (e.g., remove aspects of the source code that are not relevant or functional). Such reformatting may thus result in fewer unsupervised feature vectors after vectorization (e.g., as in block 202). However, having fewer but more relevant feature vectors may lead to faster run time of the clustering operations, leading to more datasets being produced (e.g., for supervised learning in subsequent blocks). The larger number and greater relevance of datasets may lead to more robust machine learning models in subsequent steps, leading to increased accuracy and reliability.

At the clustering module, the computing device may vectorize the source data into feature vectors (block 406). Since the sample source code that is originally receive at block 202 may be text data, and since clustering and classification operations typically function in numeric feature space, the vectorization of the source code (e.g., transforming the source code into vector representation) can allow machine learning operations to be performed. Techniques for vectorization may be similar to that described in relation to block 204 of FIG. 2. For example, the vectorization of a sample source code may result in a plurality of feature vectors for subsequent unsupervised clustering.

Since the computing device does not have training data that indicates the "correct" way to cluster the feature vectors, such feature vectors formed at this block may be referred to as unsupervised feature vectors, for simplicity.

As part of clustering the unsupervised feature vectors, the computing device may determine an optimal number of clusters (block 408). For example, the automated classification server 134 (e.g., via the clustering module 136) may initially determine an optimal number of centroids to use to begin iterative clustering operations. The clustering module may then determine the correct assignment of the selected number of centroids among the plurality of unsupervised feature vectors, reassign the centroids accordingly through an iterative process until the clusters formed are most optimal. In one aspect, the clusters formed may be most optimal if the average of the unsupervised feature vectors of a cluster is closest to the centroid. Suitable clustering techniques that may be used may include, but are not limited to: cosine similarity Jaccard similarity, Euclidean Distance, Manhattan Distance, or a Minkowski distance.

The computing device may thus partition the feature vectors into clusters (block 410). For example, clustering module 136 of the automated classification server 134 may present each sample code as a dataset comprising one or more clusters. Each cluster may be identifiable by an index (e.g., C1, C2, C3, . . . ). As part of generating training data for subsequent supervised machine learning, at least one of the clusters may be identified as having a bug presence. For example, the automated classification server 134 may receive knowledge of the bug presence in a portion of the source code by way of a bug report supplied by the bug tracking sever 102. The bug report may be a part of or comprise the source code received as part of block 402.

The classification process 411 may involve receiving a plurality of training datasets (e.g., produced through the clustering process 405 over many iterations involving a plurality of sample source codes and/or bug reports).

At the classification module, the computing device may thus receive a training dataset (block 412). For example, classification module 146 may receive a plurality of datasets produced by the clustering module 136, and classification of a given dataset is described herein.

The computing device may divide the training dataset into the plurality of clusters (block 414). For example, the classification module 146 may identify the plurality of clusters from the dataset of a sample source code that had been partitioned into a clusters of unsupervised feature vectors in block 410.

The computing device may train a machine learning model (e.g., block 416). While a classification model was previously described in block 212 of FIG. 2, other suitable machine learning models may be trained from the plurality of datasets that can detect, if given a dataset, an index of a given class having a given bug. For example, a feature vector may be generated that represents each cluster identified in block 414. The feature vector may be associated with a value indicating whether the identified cluster has a known presence of bug activity (e.g., "1") or does not have bug activity (e.g., "0"). The techniques for training the machine learning model may be similar to those described in relation to block 212 of FIG. 2.

In some aspects, the computing device may test the execution of the trained machine learning model. For example, the automated classification server 134 may test the machine learning model 148 trained through the classification procedure by feeding it various datasets to minimize bias and variance.

The trained machine learning model can thus be used to detect bugs from new source data having unknown bug activity. For example, as previously described in relation to block 302 of FIG. 3, a user may desire to test a source code for a software being developed. The user, via the automated classification app 126 of the user device 116, may thus upload, input, or and/or send such source code ("new source code") to the automated classification server 134 for testing. The automated classification server 134 can thus vectorize the new source code can create a dataset for the new source code ("new dataset") using the techniques similar to the clustering process 405 previously described.

The computing device may thus input the new dataset into the machine learning model for bug detection (block 420). For example, automated classification server 134 may input the new dataset into the machine learning model 148 (e.g., by applying the parameters, weights, and biases of the trained machine learning model to the feature vector representing each cluster of the new dataset). The trained machine learning model can thus output the index of one or more classes or clusters within the new dataset corresponding to one or more portions of the new source code that has bug presence. Such bug detection results may be sent to the user device 116 of the user. The user may assess the bug detection results and may make any revisions to the new source code as appropriate.

The computing device may send the revised source code into the software development operations pipeline for continuous integration (block 422). For example, after making revisions to the source code based on the bug detection results, the user, via user device 116, may submit the revised source code into any applications or platforms being used for software development operations. Such applications or platforms, which may allow for continuous integration, may be referred to as continuous integration app 128. The continuous integrations server 150 may receive the revised source code by way of the continuous integration app 128. Also or alternatively, the automated classification server 134 may send the bug detection results directly to the continuous integration server 150.

Figure 5:
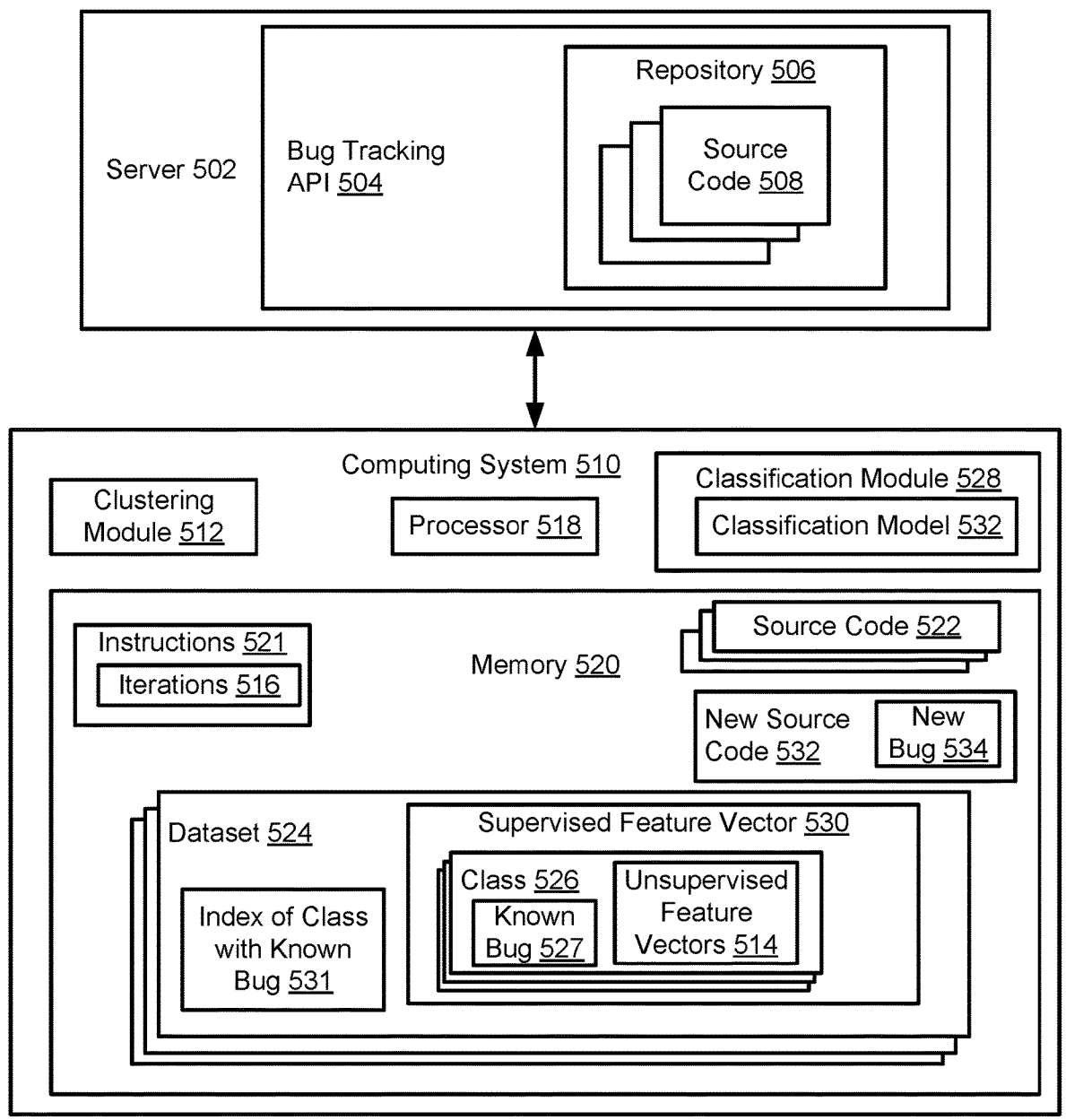
FIG. 5 illustrates a block diagram of an example computer system for an example process for automated classification of defective code from bug tracking tool data, according to an example embodiment of the present disclosure.

FIG. 5 illustrates a block diagram of an example computer system for an example process for automated classification of defective code from bug tracking tool data, according to an example embodiment of the present disclosure. The example computer system 500 may include a server 502 and a computing system 510. A bug tracking API 504 may be running on the server 502, and may include a repository 506 of different source codes 508, e.g., pertaining to different programs or pieces of programs. The computing system 510 may include memory 520, and a processor 518 in communication with the memory 520. The computing system 510 may also include a clustering module 512 and a classification module 528 to perform steps related to clustering and classification, as explained herein. In some aspects, the server 502 and the computing system 510 may share similar subcomponents and perform similar functions as the bug tracking server 102 and the automated classification server 134, respectively.

The memory 520 may store instructions 521 that, when executed by the processor 518, may cause the processor 518 to perform, at the clustering module 512, one or more iterations 516 of: receiving, from the server 502 executing the bug tracking application 504, a source code 508 (e.g., received as source code 522); vectorizing the source code 522 into a dataset 524 comprising a plurality of unsupervised feature vectors 514; and performing an unsupervised clustering of the dataset 524 into a plurality of clusters or classes 526, wherein the plurality of classes 526 are auto indexed and include at least one class with at least one known bug (e.g., index of class with known bug 531).

The classification module 528 may use or receive, from the clustering module 512, a plurality of datasets 524 having the at least one class with the at least one known bug (e.g., known bug 527 in one class of the plurality of classes 526). For each dataset of the plurality of datasets 524, a respective supervised feature vector 530 may be generated, wherein each supervised feature vector 530 may be associated with an index of the at least one class with the at least one known bug. The classification module 528 may train, using the supervised feature vectors 530, a classification model 532 that can detect, using a given dataset, an index of a given class having a given bug. Subsequently, the trained classification model 532 may be used to detect a new bug presence (e.g., new bug 534) in a new source code 532.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is as follows:

1. A method comprising:
    receiving a plurality of datasets representing a plurality of bug reports from a bug tracking application,
        wherein each dataset is generated by:
            vectorizing a source code associated with a respective bug report, resulting in a plurality of unsupervised feature vectors for each dataset; and
            performing an unsupervised clustering of each dataset into a plurality of classes specific to each dataset, wherein each class of the plurality of classes includes one or more unsupervised feature vectors of the plurality of unsupervised feature vectors, wherein the plurality of classes of each dataset includes at least one class indicating at least one known bug;
    generating, for each dataset of the plurality of datasets, a respective supervised feature vector, wherein each supervised feature vector is associated with an index of the at least one class indicating the at least one known bug;
    training, using the supervised feature vectors, a classification model that can detect, using a given dataset, an index of a given class indicating a given bug; and
    detecting, using the trained classification model, a new bug presence in a new source code.

2. The method of claim 1, further comprising, after receiving the source code,
    applying, to the source code, a predetermined set of filters to clean the source code to result in fewer unsupervised feature vectors after vectorization.

3. The method of claim 2, wherein applying the predetermined set of filters causes a decrease in runtime for generating each dataset.

4. The method of claim 1, wherein the using the trained classification model to detect the new bug presence further comprises:
    receiving the new source code with the new bug presence;
    vectorizing the new source code into a new dataset;
    generating a new feature vector corresponding to the new dataset;
    applying, to the trained classification model, the new feature vector to generate an index of a class of the new dataset indicating the new bug presence; and
    displaying, via a user interface, a portion of the new source code, the portion corresponding to the class of the new dataset indicating the new bug presence.

5. The method of claim 4, further comprising:
    performing an unsupervised clustering of the new dataset into a second plurality of classes, wherein the second plurality of classes are autoindexed and include at least one class with the new bug presence.

6. The method of claim 1, wherein the performing the unsupervised clustering of each dataset into the plurality of classes comprises:
    determining, using one or more of cosine similarity, Jaccard similarity, Euclidean Distance, Manhattan Distance, or Minkowski distance, a degree of similarity between a given unsupervised feature vector of the plurality of unsupervised feature vectors and another unsupervised feature vector of the plurality of unsupervised feature vectors.

7. The method of claim 6, wherein the performing the unsupervised clustering of each dataset into the plurality of classes comprises:
    applying, to the plurality of unsupervised feature vectors, one or more of:
    a density-based spatial clustering of applications with noise (DBSCAN);
    a K-means clustering operation;
    an expectation-maximization; or
    a hierarchical clustering operation.

8. A system comprising:
    a clustering module;
    a classification module;
    a processor; and
    memory storing instructions that, when executed by the processor, cause the processor to:
        receive, at the classification module and from the clustering module, a plurality of datasets representing a plurality of bug reports from a bug tracking application,
            wherein each dataset is generated by:
                vectorizing a source code associated with a respective bug report, resulting in a plurality of unsupervised feature vectors for each dataset; and
                performing an unsupervised clustering of each dataset into a plurality of classes specific to each dataset, wherein each class of the plurality of classes includes one or more unsupervised feature vectors of the plurality of unsupervised feature vectors, wherein the plurality of classes of each dataset includes at least one class indicating at least one known bug;

generate, for each dataset of the plurality of datasets, a respective supervised feature vector, wherein each supervised feature vector is associated with an index of the at least one class indicating the at least one known bug;

train, using the supervised feature vectors, a classification model that can detect, using a given dataset, an index of a given class indicating a given bug; and detect, using the trained classification model, a new bug presence in a new source code.

9. The system of claim 8, wherein the instructions, when executed, cause the processor to, prior to receiving the plurality of datasets, perform, at the clustering module, the unsupervised clustering of each dataset into the plurality of classes, wherein the plurality of classes are autoindexed.

10. The system of claim 9, wherein the instructions, when executed, cause the processor to, after receiving the source code, apply, to the source code, a predetermined set of filters to clean the source code to result in fewer unsupervised feature vectors after vectorization, wherein applying the predetermined set of filters causes a decrease in runtime of generating each dataset.

11. The system of claim 8, wherein the instructions, when executed, further cause the processor to detect the new bug presence by:

receiving the new source code with the new bug presence;
vectorizing the new source code into a new dataset;
generating a new feature vector corresponding to the new dataset;
applying, to the trained classification model, the new feature vector to generate a class of the new dataset having the new bug presence; and
displaying, via a user interface, a portion of the new source code, the portion associated with the class indicating the new bug presence.

12. The system of claim 11, wherein the instructions, when executed, further cause the processor to:

perform an unsupervised clustering of the new dataset into a second plurality of classes, wherein the second plurality of classes are autoindexed and include at least one class indicating the new bug presence.

13. The system of claim 8, wherein the performing the unsupervised clustering of each dataset into the plurality of classes comprises:

determining, using one or more of cosine similarity, Jaccard similarity, Euclidean Distance, Manhattan Distance, or Minkowski distance, a degree of similarity between a given unsupervised feature vector of the plurality of unsupervised feature vectors and another unsupervised feature vector of the plurality of unsupervised feature vectors.

14. The system of claim 8, wherein the performing the unsupervised clustering of each dataset into the plurality of classes comprises:

applying, to the plurality of unsupervised feature vectors, one or more of:
a density-based spatial clustering of applications with noise (DBSCAN);
a K-means clustering operation;
an expectation-maximization; or
a hierarchical clustering operation.

15. A non-transitory computer readable medium for use on a computer system containing computer-executable programming instructions, the computer-executable programming instructions comprising:

receiving a plurality of datasets representing a plurality of bug reports from a bug tracking application,
wherein each dataset is generated by:
vectorizing a source code associated with a respective bug report, resulting in a plurality of unsupervised feature vectors for each dataset; and
performing an unsupervised clustering of each dataset into a plurality of classes specific to each dataset, wherein each class of the plurality of classes includes one or more unsupervised feature vectors of the plurality of unsupervised feature vectors, wherein the plurality of classes of each dataset includes at least one class indicating at least one known bug;

generating, for each dataset of the plurality of datasets, a respective supervised feature vector, wherein each supervised feature vector is associated with an index of the at least one class indicating the at least one known bug; and training, using the supervised feature vectors, a classification model that can detect, using a given dataset, an index of a given class indicating a given bug; and detecting, using the trained classification model, a new bug presence in a new source code.

16. The non-transitory computer readable medium of claim 15, the computer-executable programming instructions further comprising, prior to the receiving the plurality of datasets, performing one or more iterations of:
receiving, from a repository associated with a bug tracking application, the source code; and
applying, to the source code, a predetermined set of filters to clean the source code.

17. The non-transitory computer readable medium of claim 16, wherein applying the predetermined set of filters causes a decrease in runtime of each of the one or more iterations.

18. The non-transitory computer readable medium of claim 15, wherein the detecting the new bug presence further comprises:

receiving the new source code with the new bug presence;
vectorizing the new source code into a new dataset;
generating a new feature vector corresponding to the new dataset;
applying, to the trained classification model, the new feature vector to generate a class of the new dataset indicating the new bug presence; and
displaying, via a user interface, a portion of the new source code, the portion corresponding to the class of the new dataset indicating the new bug presence.

19. The non-transitory computer readable medium of claim 15, wherein the performing the unsupervised clustering of each dataset into the plurality of classes comprises:

determining, using one or more of cosine similarity, Jaccard similarity, Euclidean Distance, Manhattan Distance, or Minkowski distance, a degree of similarity between a given unsupervised feature vector of the plurality of unsupervised feature vectors and another unsupervised feature vector of the plurality of unsupervised feature vectors; and applying, to the plurality of unsupervised feature vectors, one or more of:
a density-based spatial clustering of applications with noise (DBSCAN);
a K-means clustering operation;
an expectation-maximization; or
a hierarchical clustering operation.

\* \* \* \* \*